Nov. 25, 1952 A. COTSWORTH, III., ET AL 2,619,536
ELECTRICAL SIGNAL NETWORK
Filed Dec. 9, 1948 2 SHEETS—SHEET 1

ALBERT COTSWORTH III
WALTER JACOB STROH
INVENTOR.
BY Bruce L Birchard
HIS AGENT

ALBERT COTSWORTH III
WALTER JACOB STROH
*INVENTOR.*
*BY* Bruce Burchard
HIS AGENT Patented Nov. 25, 1952 2,619,536

UNITED STATES PATENT OFFICE 2,619,536

ELECTRICAL SIGNAL NETWORK

Albert Cotsworth, III, Oak Park, and Walter Jacob Stroh, Franklin Park, Ill., assignors to Zenith Radio Corporation, a corporation of Illinois Application December 9, 1948, Serial No. 64,366

3 Claims. (Cl. 178—44)

This invention relates to electrical networks for use in electrical signal translating systems, such as television receivers and the like, for directing a plurality of signals of different frequencies received over a common channel into a plurality of distinct signal channels, or for directing a plurality of different frequency components of a single composite signal received over a common channel into individual signal channels.

In an electrical signal translating system wherein a plurality of electrical signals of different frequencies are present simultaneously in a common signal channel, it is frequently desirable to direct these signals into individual signal channels, and thereby, to obtain a distinct output for each signal. This is particularly the case in a television receiver wherein a composite television signal, having video-frequency components and sound-frequency components is received and amplified in a common signal channel, and upon frequency conversion of the signal, the video-frequency components and the sound-frequency components thereof are selectively supplied to the video and sound signal channels of the receiver. In the video signal channel, the video-frequency components of the received television signal are amplified and used to reproduce the transmitted picture; and in the sound signal channel, the sound-frequency components of the received signal are amplified and used to reproduce the sound accompanying the transmitted picture.

It is desirable from a practical standpoint to provide a relatively wide physical separation in a television receiver between the common signal channel and the video and sound channels. Because of the desirability of such physical separation between the various channels, many difficulties arise in providing a network suitable for directing the various components of the received television signal present in the common channel into the individual channels. The major difficulty is to provide such a network wherein the relatively long leads connecting the common channel to the individual channels do not materially affect the gain, or frequency response, of the various channels.

It is, therefore, an object of this invention to provide a network for directing signals, or signal components, of different frequencies received on a common channel into individual channels, whereby the various channels may have a relatively wide physical separation and relatively long inter-connecting leads without materially affecting the response characteristic of the various channels.

Another object of this invention is to provide an improved network for directing the video-frequency components and sound-frequency components of a television signal received on a common channel into individual channels, which network is simple and economical to construct and operates in a highly efficient manner with a minimum of component circuits.

A further object of this invention is to provide such an improved network, in which the tuned input and output circuits of the various channels linked thereby may be individually tuned to selected resonant frequencies, even before they are linked together into a network, thus greatly simplifying the manufacturing process of the television receivers utilizing the network.

The features of this invention which are believed to be new are set forth with particularity in the appended claims. The invention itself, however, together with further objects and advantages thereof may best be understood by reference to the following description when taken in conjunction with the accompanying drawings, in which:

Figure 1:
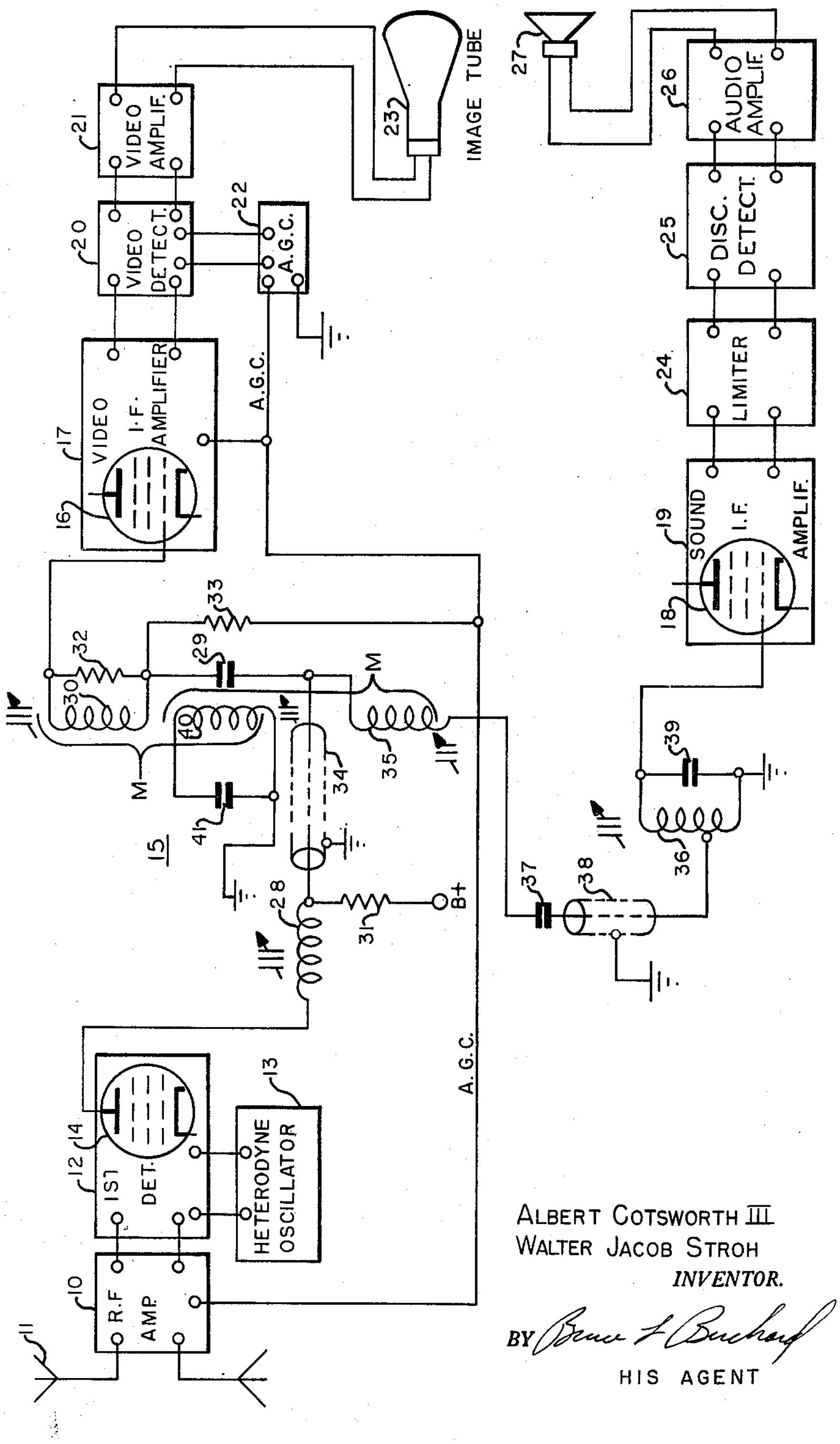
Figure 1 shows a television receiver incorporating the present invention.

In Figure 1, the signal directing network of the present invention is shown in connection with a television receiver, although it is to be understood that this network may be applied to any signal translating system in which it is desired to direct signals of a plurality of different frequencies received over a common channel into individual signal channels.

Referring now to Figure 1, the television receiver shown herein includes a radio-frequency amplifier 10 of any desired number of stages, the input terminals of this amplifier being coupled to a suitable antenna 11. The output terminals of the radio-frequency amplifier 10 are coupled to a first detector 12, which also has a heterodyning oscillator 13 coupled thereto. The first detector 12 includes an electron discharge device 14, and the anode of this device is coupled through a signal directing network 15, to be described in detail hereinafter, to the control electrode of an electron discharge device 16 included in the input stage of a video intermediate-frequency amplifier 17 of any desired number of stages. The anode of the device 14 is also coupled through the network 15 to the control electrode of a device 18 which is included in the input stage of a sound intermediate-frequency amplifier 19 having any desired number of stages. The output terminals of the video intermediate-frequency amplifier 17 are coupled to a video detector 20, which in turn is coupled to a video amplifier 21 and to an automatic gain control (A. G. C.) circuit 22. The output terminals of the automatic gain control circuit 22 are coupled to the input circuit of the device 16, and to other stages of the receiver, to control the gain thereof in the usual manner. The video amplifier 21, which may have any desired number of stages, is coupled to an image reproducing tube 23. The sound intermediate-frequency amplifier 19 is coupled to a limiter 24, which in turn is coupled to a discriminator-detector 25. The output terminals of the detector 25 are coupled to an audio amplifier 26 of one or more stages, and the output terminals of this amplifier are connected to a sound reproducing device 27.

The illustrated receiver is adapted to utilize a composite television signal, amplitude modulated with video-frequency components and frequency modulated with sound-frequency components. When such a signal is received on the antenna 11, it is amplified in the radio-frequency amplifier 10, and applied to the first detector 12. In the detector 12 the received television signal is heterodyned with a heterodyning signal from the oscillator 13, to produce an intermediate-frequency signal which contains video intermediate-frequency components and sound intermediate-frequency components. These components are effectively separated in the network 15 and directed into their individual channels in a manner presently to be described.

The video intermediate-frequency components are supplied to the video amplifier 17, wherein they are amplified and the amplified intermediate-frequency signal is detected in the video detector 20. The resulting video signals are amplified in the video amplifier 21, and applied to the image tube 23 to control this tube so that it reproduces the picture represented by the received television signal. The detected video signals are also applied to the automatic gain control circuit 22 wherein there is derived a potential for controlling the gain of the preceding amplifiers, in the usual manner. The scanning system associated with the tube 23, and the circuits for synchronizing this scanning system with the received television signal form no part of the present invention and are not shown.

The sound intermediate-frequency components of the received signal are amplified in the sound intermediate-frequency amplifier 19, and the amplified signal is passed through the limiter stage 24 to the discriminator-detector 25. The audio signals from the detector 25 are amplified in the audio amplifier 26 and applied to the sound reproducing device 27. This second channel is, of course, used when the composite television signal is frequency modulated with the sound-signal components as is usually the case, and it may be replaced by any conventional channel for utilizing sound-signal components that may be otherwise modulated on the received television signal.

Referring now more particularly to the network 15, the portion of this network coupling the anode or output electrode of the device 14 to the control or input electrode of the device 16 comprises a circuit including an inductance coil 28, a coaxial line section 34, a coupling capacitor 29 and an inductance coil 30. Operating potential is supplied to the anode of device 14 from the positive terminal B+ of a source of unidirectional potential, not shown, through a resistor 31 connected to the junction of the coil 28 and the line section 34. The coil 30 is shunted by a damping resistor 32, and the junction of this coil and the capacitor 29 is connected through a resistor 33 and the automatic gain control circuit 22 to ground. The junction of the capacitor 29 and the coaxial line section 34 is connected to a tap on the tuned input circuit 36, 39 of the device 18 through a tuned series circuit comprising an inductance coil 35 and a capacitor 37, and through a coaxial line section 38. A sound signal absorption circuit comprising an inductance coil 40 shunted by a capacitor 41 is included in the network 15. This circuit is so disposed that mutual coupling exists between the coils 40 and 30, and also slight mutual coupling exists between the coils 35 and 40 as indicated by the brackets M, M.

The operation of the portion of the network 15 coupling the output electrode of the device 14 to the input electrode of the device 16 may best be explained by reference to Figure 1A. This figure shows the approximately equivalent circuit of the above portion of the network 15, the distributed capacity of the circuit associated with coil 28 being represented as $C_1$, the distributed capacity of the circuit associated with coil 30 being represented by $C_2$, and the coaxial line section 34 being represented as a line connection between the terminal A of coil 28 and the terminal B of coil 30 and having a distributed capacity to ground shown as $C_3$.

Figure 1A:
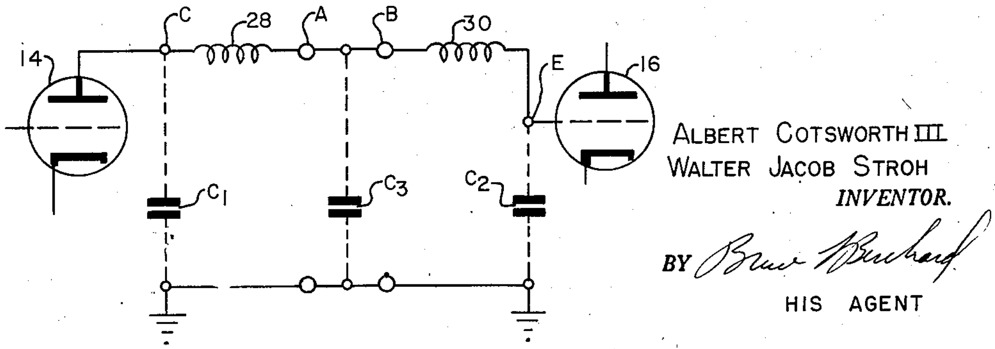
Figure 1A is a circuit diagram useful in the understanding of the invention, and, Figure 2 shows various frequency response curves of the receiver of Figure 1.

In order that the portion of the network 15 of Figure 1 indicated in the Figure 1A may pass the video intermediate-frequency components of the received television signal, the series circuit consisting of the coil 30 and capacitor $C_2$ is tuned to be series-resonant at the video intermediate-frequency, or at a frequency near the video intermediate-frequency for vestigial side band reception. Therefore, the impedance between the terminal B and ground, which is formed by the series-circuit (30, $C_2$), decreases as the resonant frequency thereof is approached, and is relatively low at the resonant frequency. Similarly, the series circuit (28, $C_1$) is tuned to be series-resonant at the resonant frequency of the circuit (30, $C_2$), and the impedance between the terminal A and ground is relatively low at this resonant freqeuncy. On the other hand, the impedance between the terminal E and ground, and the terminal C and ground, being composed of the capacitive values $C_2$ and $C_1$ respectively, is relatively high at the resonant frequency. Therefore, when the device 14 produces the video intermediate-frequency signal the terminal C is at a relatively high alternating potential with respect to ground, and the terminal A is at a relatively low alternating potential with respect to ground. The line connecting the terminals A to B carries a relatively high current but this line is at a relatively low potential with respect to ground. The terminal E which is connected to the input electrode of the discharge device 16 is at a relatively high potential.

Therefore, in Figure 1, the line member 34 conducts relatively high current at the video intermediate-frequency and this current carrying line member forms the sole coupling between the input circuit including coil 28 and the output circuit including coil 30. This line 34 is substantially at ground potential at the video intermediate-frequency, and the effect of the capacity of this line at this frequency is therefore negligible.

The above description was based on the assumption that the characteristic of the coaxial line section 34 may be represented by a lumped capacity $C_3$, as shown in Figure 1A. This holds true for any desired length of the coaxial line less than a quarter wave length, and at the usual video intermediate-frequency of 25 megacycles the length of the coaxial line may be extended up to approximately six feet and still exhibit this characteristic. Furthermore, the length of this line may be extended beyond this limit without adversely affecting the frequency response characteristic of the video channel when the quality factor of the circuit (30, $C_2$) is chosen to provide the required terminating impedance for the coaxial line.

Figure 2:
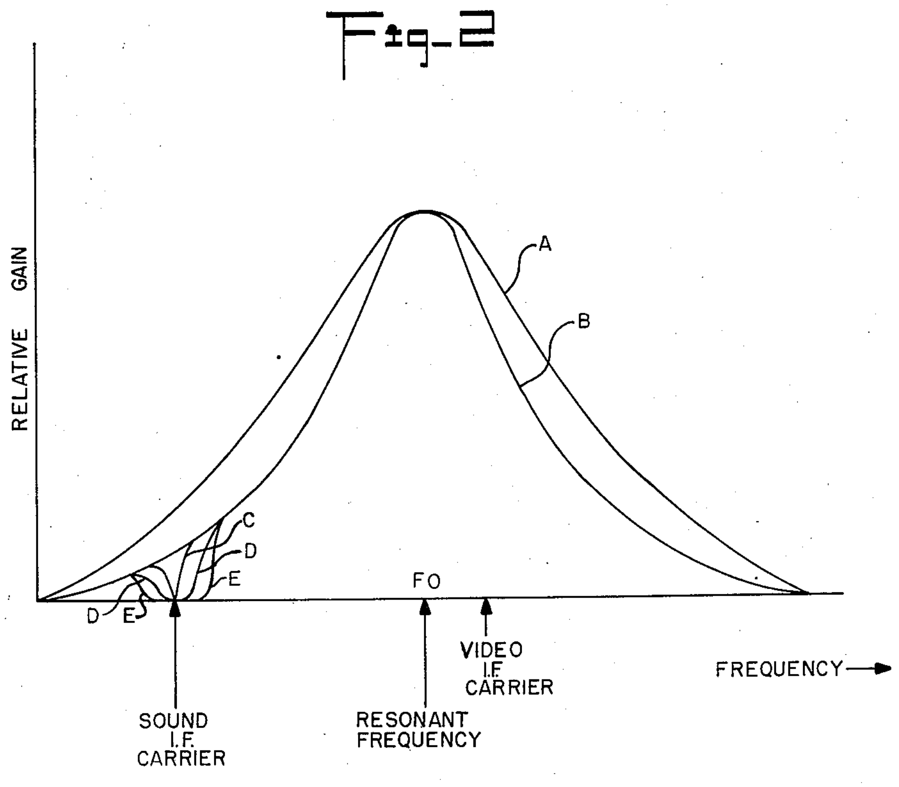

The relative gain, or frequency response, of the above described channel of the network 15, of Figure 1 is shown in Figure 2. The curve A shows this response when the line connecting the terminals A and B of Figure 1A is of a negligible length, and as shown this curve rises to a maximum at the frequency to which the circuits (28, $C_1$) and (30, $C_2$) are tuned to be resonant. As shown, this resonant frequency is made slightly less than the frequency of the video intermediate-frequency signal, in accordance with the usual practice in television reception. Assume now that the terminals A and B of Figure 1A are connected by means of the coaxial line section 34 of Figure 1, and this section has any appreciable length up to a quarter wave length of the video intermediate-frequency signal. It has been shown that since this line is substantially at ground alternating potential at the video-intermediate frequency, the effect of the distributed capacity thereof is reduced to approximate zero at this frequency. At signal frequencies in the neighborhood of the resonant frequency there is a slight attenuation in the netwrok due to the distributed capacity of the coaxial line, and the frequency response curve of the video channel takes the form shown by curve B. As shown by this curve, the response of the video channel to signal frequencies in the neighborhood of the resonant frequency is not materially affected by the length of the coaxial line section 34, and the video channel may, therefore, be widely separated physically from the common channel.

The sound intermediate-frequency components are removed from the video channel by means of the series-resonant tuned circuit consisting of the coil 35 and capacitor 37. One terminal of this circuit is connected to the junction of the coaxial line section 34 and capacitor 29, and the other terminal thereof is connected to a tap on the coil 36 through the coaxial line section 38, the tap on the coil 36 being near the grounded terminal of this coil. The series circuit (35, 37) is tuned to be resonant at the frequency of the sound intermediate-frequency carrier and provides a low impedance path to ground for signals at or near this intermediate-frequency. Therefore, a sharp dip appears in the curve B of Figure 2 at the frequency of the sound intermediate-frequency carrier, and this dip is shown by the curve C. The tap on the coil 36 is sufficiently far removed from the grounded terminal of this coil to cause signal frequencies in the neighborhood of the sound intermediate-frequency to be induced in the tuned input circuit (36, 39) of the device 18 of the sound intermediate-frequency amplifier 19, the circuit (36, 39) being tuned to resonate at the frequency of the sound intermediate-frequency signal. However, the tap on the coil 36 is sufficiently near the grounded terminal of this coil so that the portion of the coil lying between this tap and ground presents a low impedance path to the coaxial line section 38, and this line section is substantially at ground potential. Therefore, the distributed capacity of the line 38 does not materially affect the frequency response characteristic of the sound channel. Hence, as in the case of the coaxial line section 34, the coaxial line section 38 may have any appreciable length less than a quarter wave length of the sound intermediate-frequency signal, and the sound channel have a wide physical separation from the other channels, without affecting the gain of this channel to sound frequencies within the range of the sound intermediate-frequency.

The absorption circuit, consisting of the inductance coil 40 and capacitor 41 is tuned to be resonant at the frequency of the sound intermediate-frequency carrier, and this circuit acts to attenuate signal frequencies at the resonant frequency thereof in the coil 30, in the usual manner. The resonant frequency of the absorption circuit causes a dip, as shown by the curve D, to occur in the curve V in the neighborhood of the sound intermediate-frequency carrier. The coil 40 of the absorption circuit is so disposed that further inductive coupling occurs between this coil and the coil 35 in such a manner that the signals induced in the absorption circuit 40, 41 are induced in the sound channel circuit 35, 37. The coupling between the coils 40 and 35 may be adjusted to give any desired band width to the band pass characteristics of the sound channel, and the effect of this coupling is shown by the curve E. In this manner, the sound channel is responsive to signals in the neighborhood of the sound intermediate-frequency signal, and has a pass band that is broad enough so that drifts in the heterodyning oscillator do not cause the sound intermediate-frequency signal to fall outside the range of the sound channel.

This invention provides, therefore, an improved electrical network for directing signals of different frequencies and received on a common signal channel into individual signal channels, whereby the various channels may have a wide physical separation from each other without materially affecting the gain, or frequency response, of these channels. The improved network of this invention, furthermore, operates efficiently and effectively and with a minimum number of component circuits; and these circuits may be tuned easily and conveniently and even before they are assembled into the network, since the coupling between these circuits is effected solely by the current carrying line members 34 and 38.

As previously stated, when the coaxial line sections 34 and 38 exhibit capacitive characteristics at their operating frequencies, no provision for proper termination is necessary for these lines. Therefore, these lines may have any desired length up to a quarter wave length of the respective intermediate frequencies. These lengths should be sufficient to fulfill any requirements for wide physical separation of the various channels in conventional television receivers. However, should greater lengths be required for these lines, and the providing of proper termination therefor prove inconvenient, they may be given a length that is any whole multiple of the respective wave lengths plus an added length that is less than a quarter of the respective wavelengths.

While a particular embodiment of the invention has been shown and described, modifications may be made, and it is intended in the appended claims to cover all such modifications as fall within the true spirit and scope of the invention.

We claim:

1. An electrical network for directing the modulated video carrier wave of a television signal from a common signal channel into a video signal channel, said common channel including an electron-discharge device having an anode and said video channel including an electron-discharge device having a control electrode, said network comprising: a first circuit including an inductive reactance having one end coupled to said anode and a capacitive reactance, at least a significant portion of which is constituted by stray capacity from said anode to a point of reference potential, connecting said end of said inductive reactance to said point of reference potential to constitute with said inductive reactance a first series-resonant circuit tuned approximately to the frequency of said video carrier; a second circuit including an inductive reactance having one end coupled to said control electrode and a capacitive reactance, at least a significant portion of which is constituted by stray capacity from said control electrode to said point of reference potential, connecting said end of said last-mentioned inductive reactance to said point of reference potential to constitute therewith a second series-resonant circuit tuned to the resonant frequency of said first series-resonant circuit, whereby the other ends of said inductive reactances are established at said reference potential for signal frequencies; and a line conductor interconnecting said other ends of said inductive reactances and constituting the sole coupling link between said first and second circuits, whereby the signal-transmission characteristics of said channels are substantially independent of the distributed capacity between said line conductor and said point of reference potential.

2. An electrical network for directing at least two modulated carrier waves from a common signal channel into individual signal channels comprising: a first circuit including an inductive reactance having one end coupled to said common channel and a capacitive reactance connecting said end of said inductive reactance to a point of reference potential to constitute with said inductive reactance a first series-resonant circuit tuned approximately to the frequency of one of said carrier waves; a second circuit including an inductive reactance having one end coupled to one of said individual channels and a capacitive reactance connecting said end of said last-mentioned inductive reactance to said point of reference potential to constitute therewith a second series-resonant circuit tuned to the resonant frequency of said first series-resonant circuit; a first line section inter-connecting the other ends of said inductive reactances to constitute the sole coupling link between said first and second circuits; a third circuit including an inductive reactance having one end coupled to a second of said individual channels and having its other end connected to said point of reference potential and a capacitive reactance shunting said last-mentioned inductive reactance to constitute therewith a resonant circuit tuned to the frequency of a second of said carrier waves; a fourth circuit having one end coupled to said first line section including an inductive reactance and a series-connected capacitive reactance tuned to the frequency of said second carrier wave; and a second line section interconnecting the other end of said fourth circuit to a low-impedance tap on said inductive reactance of said third circuit.

3. An electrical network for directing at least two modulated carrier waves from a common signal channel into individual signal channels comprising: a first circuit including an inductive reactance having one end coupled to said common channel and a capacitive reactance connecting said end of said inductive reactance to a point of reference potential to constitute with said inductive reactance a first series-resonant circuit tuned approximately to the frequency of one of said carrier waves; a second circuit including an inductive reactance having one end coupled to one of said individual channels and a capacitive reactance connecting said end of said last-mentioned inductive reactance to said point of reference potential to constitute therewith a second series-resonant circuit tuned to the resonant frequency of said first series-resonant circuit; a first line section inter-connecting the other ends of said inductive reactances to constitute the sole coupling link between said first and second circuits; a third circuit including an inductive reactance having one end coupled to a second of said individual channels and having its other end connected to said point of reference potential and a capacitive reactance shunting said last-mentioned inductive reactance to constitute therewith a resonant circuit tuned to the frequency of a second of said carrier waves; a fourth circuit having one end coupled to said first line section including an inductive reactance and a series-connected capacitive reactance tuned to the frequency of said second carrier wave; a second line section interconnecting the other end of said fourth circuit to a low-impedance tap on said inductive reactance of said third circuit; and an absorption circuit tuned to the frequency of said second carrier wave inductively coupled to the inductive reactance of said second circuit and to the inductive reactance of said fourth circuit.

ALBERT COTSWORTH, III.
WALTER J. STROH.

REFERENCES CITED

The following references are of record in the file of this patent:

UNITED STATES PATENTS

| Number | Name | Date |
|---|---|---|
| 2,207,796 | Grundmann | July 16, 1940 |
| 2,223,822 | Grundmann | Dec. 3, 1940 |
| 2,240,295 | Grundmann | Apr. 29, 1941 |
| 2,360,475 | Chatterjea et al. | Oct. 17, 1944 |

FOREIGN PATENTS

| Number | Country | Date |
|---|---|---|
| 483,276 | Great Britain | Apr. 12, 1938 |
| 527,602 | Great Britain | Oct. 11, 1940 |